United States Patent [19]
Onoe et al.

[11] Patent Number: 5,951,642
[45] Date of Patent: Sep. 14, 1999

[54] SYSTEM FOR COLLECTING DETAILED INTERNET INFORMATION ON THE BASIS OF THE CONDITION OF ACTIVITIES OF INFORMATION VIEWERS VIEWING INFORMATION OF SERVICE PROVIDERS

[75] Inventors: Takutaro Onoe, New York; Jason Yi-Yu Chiang, Forest Hills, both of N.Y.

[73] Assignee: HyperTak, Inc., New York, N.Y.

[21] Appl. No.: 08/907,237

[22] Filed: Aug. 6, 1997

[51] Int. Cl.⁶ .................................................. G06F 13/00
[52] U.S. Cl. ............................................................ 709/224
[58] Field of Search ...................... 395/200.32, 200.33, 395/200.47, 200.49, 200.54, 200.53, 200.76, 200.57; 348/7, 12; 709/217, 219, 220, 224

[56] References Cited

U.S. PATENT DOCUMENTS

| | | | |
|---|---|---|---|
| 5,493,492 | 2/1996 | Cramer et al. | 705/32 |
| 5,717,923 | 2/1998 | Dedrick | 707/102 |
| 5,721,908 | 2/1998 | Lagarde et al. | 707/10 |
| 5,768,255 | 6/1998 | Brownmiller et al. | 370/248 |
| 5,819,271 | 10/1998 | Mahoney et al. | 707/9 |
| 5,862,327 | 1/1999 | Kwang et al. | 707/10 |
| 5,870,558 | 2/1999 | Branton, Jr. et al. | 709/224 |

*Primary Examiner*—Moustafa M. Meky
*Attorney, Agent, or Firm*—McCormick, Paulding & Huber

[57] ABSTRACT

There is provided a technology for acquiring automatically detailed information based on the results of statistical processing of the condition of the activities of information viewers. The technology is offered for the acquisition of on-Internet information such that it is possible for information providers to improve upon the information which is viewed on the WWW, electronic mail, or the like.

A network system connects the server of on-Internet information providers, the information viewer clients and the server of an information collector, whereby, in accordance with Steps 201–210, when an information viewer starts the interface with the information collection client program when viewing the WWW of an information provider, the viewing information as to the URL and time of the WWW viewed is collected onto the server of the information collector; this viewing information is statistically processed by access time, access frequencies, viewers' genders, viewers' age groups and viewers' regions, and, based on the results of this statistical processing, it is that which automatically acquires detailed on-Internet information to the server of the information collector.

9 Claims, 10 Drawing Sheets

Fig. 1

1 : Server of the Information Provider
2 : Client of the Information Viewer
3 : Server of the Information Collector
4 : Storage Medium

Fig. 3

Contents of the Data Base

| Name of User | Access Time | URL (Address) |
|---|---|---|
| Jason | 06/25/96 19:59:10 | http://www.fujitsu.com |
| Judy | 06/27/96 10:25:05 | http://www.hypertak.com |

Fig. 4(a)

Total Ranking
Order of Total Access Time

| Rank K | Total Time | Address |
|---|---|---|
| 1 | 30 hours 15 minutes 45 seconds | http://www.fujitsu.com |
| 2 | 24 hours 12 minutes 6 seconds | http://www.nec.com |
| 3 | 22 hours 19 minutes 37 seconds | http://www.apple.com |
| 4 | 7 hours 45 minutes 58 seconds | http://www.toshiba.com |
| 5 | 3 hours 32 minutes 12 seconds | http://www.hp.com |

Fig. 4(b)

Total Ranking
Order of Total Access Frequencies

| Rank K | Total Frequencies | Address |
|---|---|---|
| 1 | 545 times | http://www.fujitsu.com |
| 2 | 423 times | http://www.nec.com |
| 3 | 265 times | http://www.apple.com |
| 4 | 198 times | http://www.toshiba.com |
| 5 | 14 times | http://www.hp.com |

Fig. 5

Ranking for Age Groups
Age Group Ranking: Top 3 in order of Total Frequencies and Total Time of Access
By Age Group of Under 18 Years Old (18-25, 26-35, 36-49, 50-60, Over 60)

| Rank-ing | Total Frequencies | Address | Total Time | Address |
|---|---|---|---|---|
| 1 | 545 Times | http://www.fujitsu.com | 4 hours 42 minutes 12 seconds | http://www.nec.com |
| 2 | 423 Times | http://www.nec.com | 3 hours 32 minutes 12 seconds | http://www.fujitsu.com |
| 3 | 265 Times | http://www.apple.com | 3 hours 17 minutes 21 seconds | http://www.apple.com |

Fig. 6

Ranking for Genders
Gender Ranking: Top 3 in order of Total Frequencies and Total Time of Access
By Men (Women)

| Rank-ing | Total Frequencies | Address | Total Time | Address |
|---|---|---|---|---|
| 1 | 545 Times | http://www.fujitsu.com | 4 hours 42 minutes 12 seconds | http://www.toshiba.com |
| 2 | 423 Times | http://www.nec.com | 3 hours 32 minutes 12 seconds | http://www.panaso.com |
| 3 | 265 Times | http://www.apple.com | 3 hours 17 minutes 21 seconds | http://www.fujitsu.com |

Fig. 7

Comparative Analysis of Menu Pages and Overall

|  | Your Company's Menu Page | Other Company's Menu Page | Your Company's Overall Site | Other Company's Overall Site |
|---|---|---|---|---|
| No. of Pages | ... | ... | 582 | 724 |
| No. of Links | 32 | 7 | 3214 | 1257 |
| No. of Words | 632 | 125 | 5432 | 4325 |
| No. of Graphics | 4 | 12 | 78 | 124 |
| Ratio of Graphics Area | 12 % | 43 % | 8 % | 32 % |
| No. of Image Maps | 2 | 8 | 47 | 84 |
| Ratio of Image Map Area | 7 % | 8 % | 6 % | 10 % |
| No. of AVI, WAVE Files | 0 | 1 | 7 | 41 |
| Background Color | White | Black | ... | ... |

Fig. 9

Contents of the Data Base (Electronic Mail)

| Name of User | Start Time of Viewing | End Time of Viewing | Title | Sender | Date |
|---|---|---|---|---|---|
| Jason | 06/25/96 20:23:05 | 06/25/96 20:24:05 | Political News | seiji@seiji.com | 06/24/96 |
| Judy | 06/26/96 08:11:11 | 06/26/96 08:12:05 | Sports News | sport@sport.com | 06/24/96 |

Fig. 10(a)

Total Ranking
Order of Total Viewing Time

| Rank | Total Time | Title |
| --- | --- | --- |
| 1 | 3 hours 03 minutes 12 seconds | Political News |
| 2 | 2 hours 23 minutes 34 seconds | ABC Newspaper News |
| 3 | 2 hours 07 minutes 23 seconds | Sports News |
| 4 | 1 hour 45 minutes 34 seconds | XYZ Daily News |
| 5 | 37 minutes 55 seconds | Economic News |

Fig. 10(b)

Total Ranking
Order of Total Viewing Frequencies

| Rank | Total Frequencies | Title |
| --- | --- | --- |
| 1 | 312 times | Political News |
| 2 | 276 times | XYZ Daily News |
| 3 | 213 times | Sports News |
| 4 | 176 times | ABC Newspaper News |
| 5 | 49 times | Economic News |

Fig. 11

Ranking for Age Groups
Age Group Ranking: Top 5 in order of Total Frequencies and Total Time of Viewing
By Age Group of 25-36 Years Old

| Rank-ing | Total Viewin Frequencies | Title | Total Viewin Time | Title |
|---|---|---|---|---|
| 1 | 351 Times | Polical News | 3 hours 03 minutes 12 seconds | Political News |
| 2 | 284 Times | ABC Newspaper News | 2 hours 23 minutes 34 seconds | ABC Newspaper News |
| 3 | 264 Times | Sports News | 2 hours 07 minutes 23 seconds | Economic News |
| 4 | 120 Times | XYZ Daily News | 1 hour 45 minutes 34 seconds | Sports News |
| 5 | 45 Times | Economic News | 37 minutes 55 seconds | XYZ Daily News |

Fig. 12

Ranking for Genders
Gender Ranking: Top 5 in order of Total Frequencies and Total Time of Viewing
By Women

| Rank-ing | Total Viewin Frequencies | Title | Total Viewin Time | Title |
|---|---|---|---|---|
| 1 | 331 Times | XYZ Daily News | 3 hours 43 minutes 32 seconds | XYZ Daily News |
| 2 | 235 Times | Sports News | 2 hours 25 minutes 34 seconds | ABC Newspaper News |
| 3 | 214 Times | ABC Newspaper News | 2 hours 24 minutes 23 seconds | Economic News |
| 4 | 113 Times | Political News | 1 hour 34 minutes 34 seconds | Sports News |
| 5 | 56 Times | Economic News | 32 minutes 45 seconds | Political News |

SYSTEM FOR COLLECTING DETAILED INTERNET INFORMATION ON THE BASIS OF THE CONDITION OF ACTIVITIES OF INFORMATION VIEWERS VIEWING INFORMATION OF SERVICE PROVIDERS

BACKGROUND OF THE INVENTION

1. Field of the Invention

The present invention relates to a technology which is applicable and effective for an on-Internet information collection method, a storage medium and an on-Internet information collection system. This technology is one which is appropriate for acquiring detailed on-Internet information which is based on the condition of activities relative to information collecting technology on the Internet. In particular, the acquisition of this information in accordance with the present invention occurs when an original information collection client program has been installed and activated for an information viewer to view an information provider's WWW (World Wide Web) site, electronic mail, mailing lists, netnews, or the like.

2. Related Art Statement

The following is a description of the technology which has thus far been available and which have been studied by the inventors. The technology thus far available has related to networking on the Internet by means of computers. This networking is such that it connects on the Internet servers of a plurality of information providers and clients of a plurality of information viewers. This networking also includes such services by which information as well as electronic mail, mailing lists, and netnews and other such services are provided in such a way that an information provider can specify the WWW site address of a specific information provider which corresponds to an URL (Uniform Resource Locator). There are a variety of types of uses by which it is possible to use such services in the form of multi-media communications on the Internet.

The technology which relates to the service of information providers on the Internet as described above is such that it is possible for the information viewer to view the desired WWW site of the information provider by indicating the URL. The information provider is concerned about the condition of the activity of information viewer's access, and among information providers, technology such as for the collection of the access frequencies and such, and the detailed information based on such has been desired. The technology which relates to the service of information providers on the Internet as described above and which has been available thus far has been such that it has not been able to fulfill these desires of information providers.

For example, in recent years, methods for calculating the number of clicks made by information viewers on an information provider's web site and market research methods which use questionnaires have been considered as ways for surveying viewership on the Internet. The click counting relates to investigation into the number of clicks on this page, and the questionnaires relate to investigating by means of questionnaires as to what pages and companies gave memorable impressions. As such, these do not allow one to extrapolate detailed information.

Then the inventors of the present invention focused on viewers who use a browser on the Internet, on recording the condition of the on-Internet viewing activity of information viewers who were viewing the WWW web sites of information providers. After statistically processing all of this recorded data, the inventors devised a method of transmitting automatically the viewed URLs to collect on-Internet information based on the statistical results made possible by means of software.

That is to say, the inventors conceived an original program which is automatic. This program is for transmission of the viewed URLs. By activating this program, after knowing the WWW addresses, the genders of information viewers and the age groups of information viewers, and by following the actual pages, it is possible to conduct statistical investigating into factors such as actually how many minutes were spent reading which page. Thus it is now possible to deduce detailed information such as the pages which did not leave an impression, something that would not be possible to learn of through a questionnaire. It is also now possible to obtain detailed information which could not be obtained through the market research method of counting the number of clicks or through questionnaires.

SUMMARY OF THE INVENTION

Accordingly, an object of the present invention is to provide an on-Internet information collection method, storage medium and information collection system which are capable of automatically acquiring detailed on-Internet information. The detailed on-Internet information thus acquired is based on the statistical processing of the condition of the activity of these information viewers when the original information collection client program has been installed and activated.

Furthermore, with the present invention, it is possible to provide an on-Internet information collection technology which can be used by the information provider to improve upon the information being provided and to be viewed on the information provider's WWW site. This is made possible by supplying to the appropriate information provider with these results of the statistical processing and the detailed information which has been collected.

Furthermore, with the present invention, it is possible to provide an on-Internet information collection technology which can be used to automatically acquire the detailed on-Internet information which is similarly based on the results of the statistical processing, relating to, in addition to pull-type information at a WWW site, push-type information such as electronic mail and mailing lists, and information such as netnews, so that the information provider can further improve upon the information being provided and to be viewed.

Among the inventions disclosed herein, the outline of the representative ones will be briefly explained as follows.

Namely, the on-Internet information collection method of the present invention is that which, on the Internet wherein the multiple servers of information providers and the multiple clients of information viewers and an information collector's server are connected, it is applicable to an information collection method which is based on the viewing activity of information viewers on the information provider's WWW site onto the information collector's server. As such, when an information viewer views an information provider's WWW site and when the information collection client program has been installed and is activated, information as to the URL and how long that the viewer viewed that WWW site is acquired onto the server of the information collector. Then this acquired viewer information is statistically processed according to access time, access frequencies, and genders, age groups and geographic regions of viewers. Then the detailed on-Internet information, which is based on the results of this statistical processing, is automatically acquired by the information collector's server.

In particular, the present invention is that by which the types of the detailed information regarding the number of pages, the number of links, the number of characters, the types of fonts, the sizes of the fonts, the number of charts, the number of graphics, the ratio of the area of the graphics area, the number of image maps, the number of AVI (Audio Video Interleave) files, the number of WAVE files, the types of backgrounds, the colors of the background, the types of plug-ins, and such is acquired. Furthermore, the results of the statistical processing according to access time, access frequencies, and genders, age groups and geographic regions of viewers and the on-Internet detailed information which is based on the results of this statistical processing are made available to the information provider.

By means of this, it is possible to automatically acquire the viewing information which has been collected by market research methods such as the method of compiling the number of clicks and questionnaires filled in by Internet users of the information collection client program. By means of the automatic gathering of this viewing information it is possible to acquire viewing information which is more unbiased and which is more detailed. Also, until now, in evaluating his web site, only the number of clicks and the number of people accessing have been the standards. By using this information collection client program, it is now possible to fully know which web sites of other companies are being accessed by those who have accessed his web site.

Also, the storage medium of the present invention is one which is applicable for recording the information collection client program for the purposes of collecting the information, which is based on the condition of the information viewers' viewing activity on the information providers' WWW sites, onto the information collector's server. The present invention's storage medium is such that it stores the process of acquiring the viewing information regarding the URL and the access time of that URL by the information viewer of the information provider's WWW site, onto the information collector's server. The statistical processing according to access time, access frequencies, and genders, age groups and geographic regions of viewers, this collected viewing information, and the process of collecting the on-Internet detailed information, which is based on the results of this statistical processing, are stored on the information collector's server. This information collector's server is that which stores the information collection client program of this storage medium onto the information provider's server or the information collector's server.

By means of this, when the information collection client program has been installed and is activated, and when the information viewer views the information provider's WWW site, it is possible to automatically acquire the viewing information up to the process of acquiring the detailed information by merely writing/storing the information client program. This information client program is contained in the memory of the storage medium in the information provider's server or in the information collector's server.

Furthermore, the on-Internet information collection system of this invention also connects on the Internet the information collector's server, which has the means of collecting the viewer information as to the URL and how long the information viewer viewed the information provider's WWW site, the means of storing this acquired viewing information, and the means of acquiring the on-Internet detailed information which is based on the results of statistically processing this stored viewing information according to access time, access frequencies, and genders, age groups and geographic regions of viewers.

By means of this, on the Internet, it is possible to automatically acquire the detailed on-Internet information, which is based on the results of the statistical processing of the viewing information stored by the storage means for the viewing information collected by the means for the acquiring of the viewing information, when the information collection program has been installed and is activated and when the information viewer views the information provider's WWW site. This is possible by the means for acquiring the detailed information through the connection of the information collector's server to the multiple information providers' servers and the multiple information viewers' clients.

Based on the above described information collection technology it becomes possible for the information provider who has established a web site to know more detailed information such as who viewed which page for how long, which companies are competitors on the Internet for the information provider, whether or not his site is in an advantageous position or a disadvantageous position vis-a-vis the web sites of his competition, what are the sort of problems his web site has, what are strengths of his web site, and what should be done in order to make his web site more effective.

Further, other on-Internet information collection method, storage medium, and on-Internet information collection system of the invention are applicable to a technology for acquiring information which is based on the condition of information viewers' activity of viewing electronic mail, mailing lists, and netnews, onto an information collector's server. When an information client program has been installed and is activated when an information viewer views electronic mail, mailing lists, netnews of an information provider, viewing information as to titles, senders, dates, and time periods of the electronic mail, mailing lists, and netnews viewed by the information viewer is acquired onto the information collector's server. The acquired viewing information is statistically processed according to viewing time, viewing frequencies, and genders, age groups and geographic regions of viewers. Then the detailed on-Internet information, which is based on the results of this statistical processing, is automatically acquired by the information collector's server.

By means of this, it is possible to automatically acquire the detailed on-Internet information which is similarly based on the results of the statistical processing, relating to, in addition to pull-type information at a WWW site, push-type information such as electronic mail and mailing lists, and information such as netnews, so that the information provider can further improve upon the information being provided and to be viewed of the information provider.

The above-described and other objects and novel features of the present invention will become more apparent from the following written description and the accompanying drawings.

BRIEF DESCRIPTION OF THE DRAWINGS

In the following, preferred embodiments of the present invention will be described in detail by referring to the accompanying drawings wherein.

DESCRIPTION OF THE PREFERRED EMBODIMENT (Embodiment 1)

Figure 1:
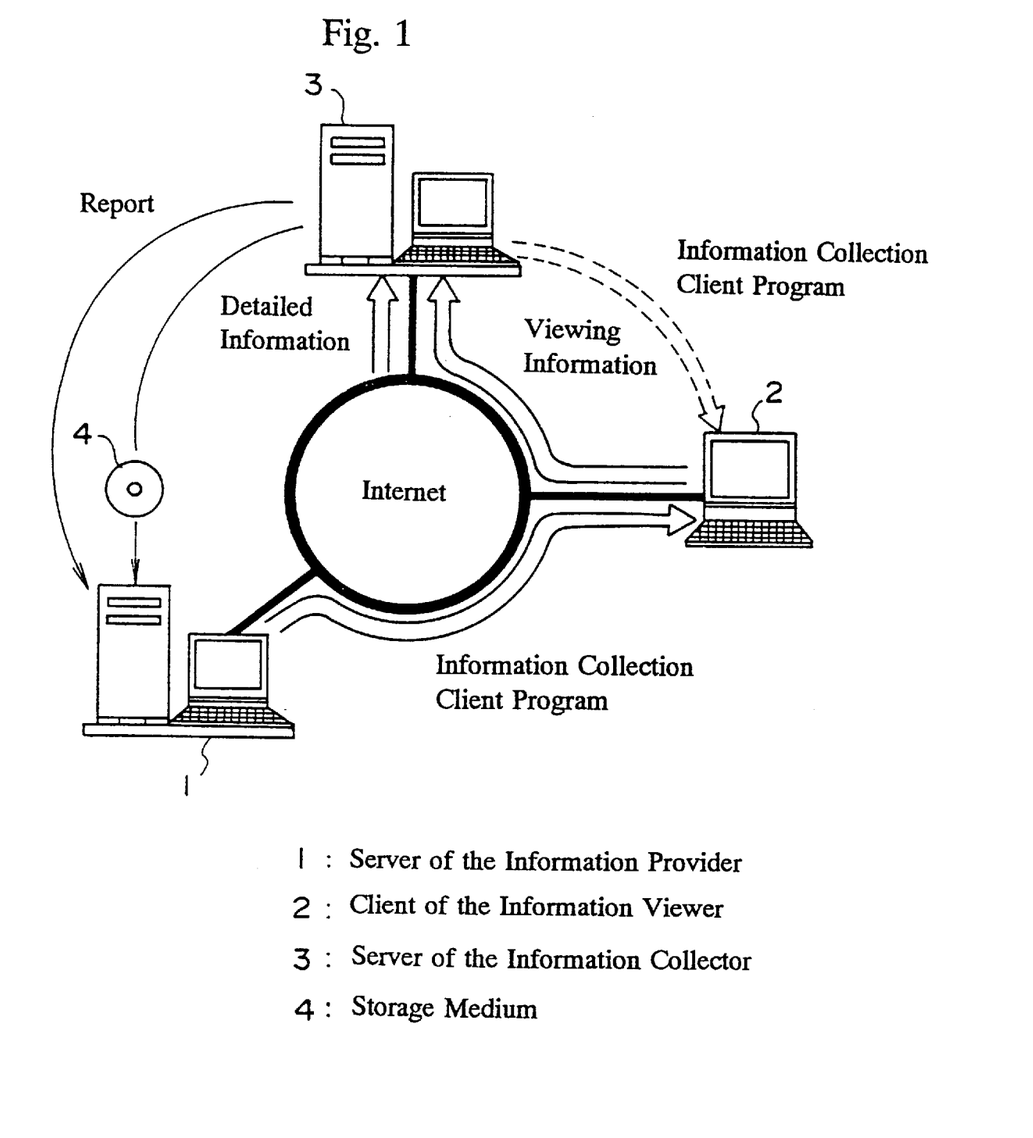
FIG. 1 is a schematic diagram showing an on-Internet network system as an embodiment of the present invention.
Figure 2:
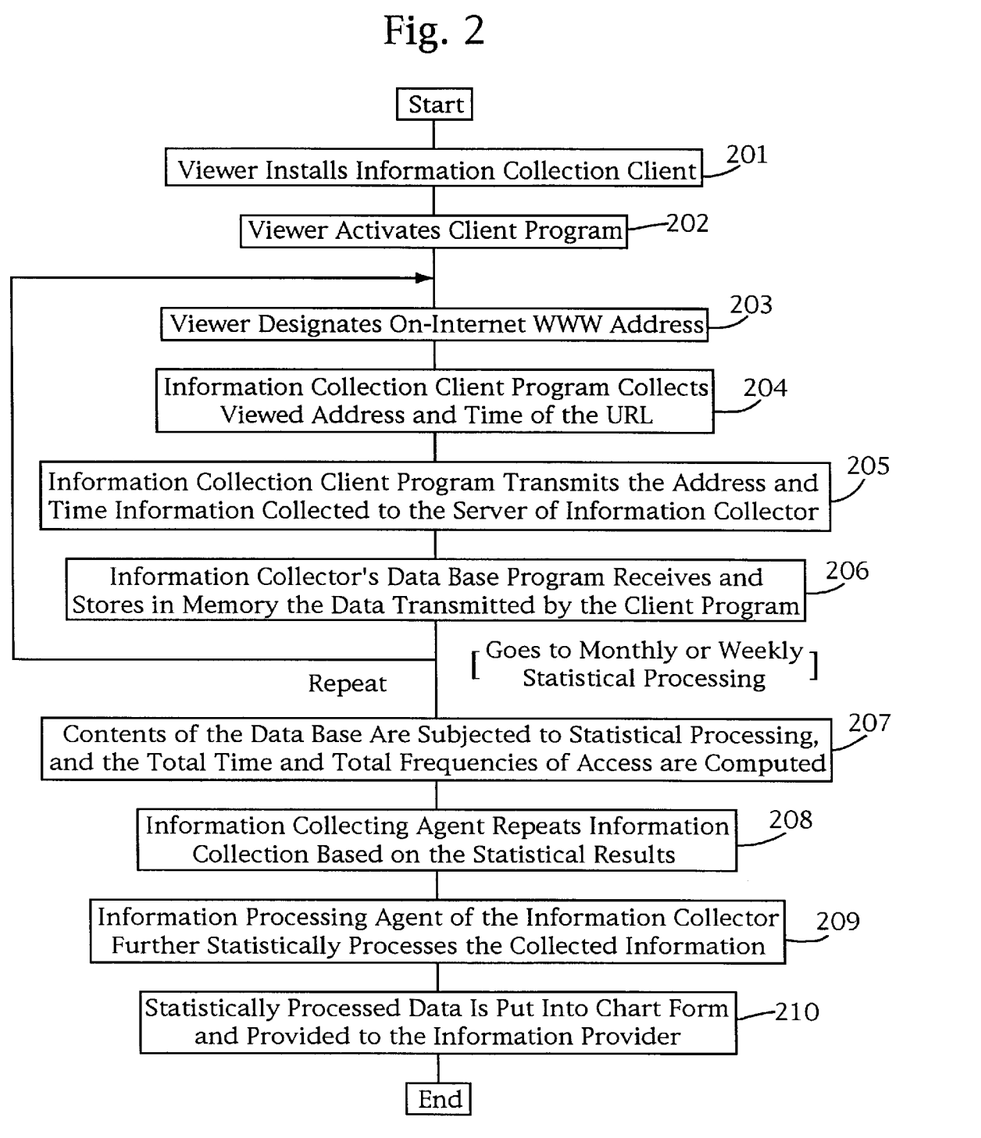
FIG. 2 is a flow chart showing an example of the order of the processing by the information collection client program in the embodiment of FIG. 1.
Figure 3:
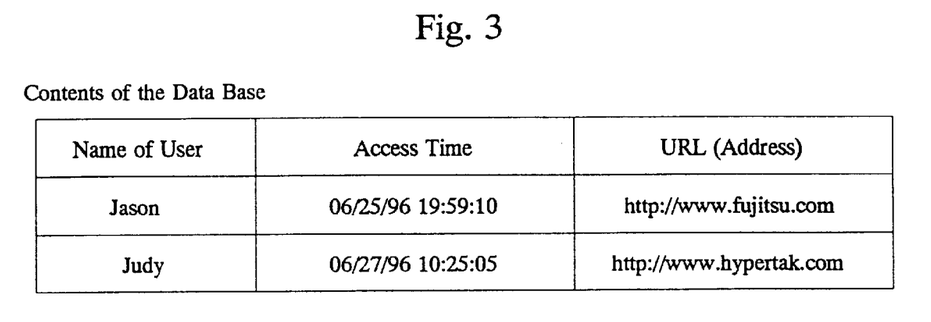
FIG. 3 is an explanatory diagram showing an example of the contents of the data base in the embodiment of FIG. 1.

FIG. 1 is a schematic diagram showing an on-Internet network system as an embodiment of the present invention; FIG. 2 is a flow chart showing an example of the order of the processing by the information collection client program in this embodiment; FIG. 3 is an explanatory diagram showing an example of the contents of the data base in this embodiment; and FIGS. 4–7 are explanatory diagrams showing the results of the statistical processing to be attached to a report in this embodiment.

First, general configuration of a network system on the Internet as an embodiment of the present invention is described by referring to FIG. 1.

The network system on Internet of this embodiment comprises, for example, servers 1 of a plurality of information providers, clients 2 of a plurality of information viewers and a server 3 of an information collector. They are connected with each other on the Internet. Moreover, in FIG. 1, in order to simplify the network system, the embodiment indicated is such that one information provider's server 1 and one information viewer's client 2 have been connected.

The information provider's server 1 functions as a computer which supplies information in the form of on-Internet responses to requests from the information viewer. License for the information collection client of the viewer information can be received from the information collector; the information collector can register on his own WWW site or it can link to another information collection client WWW site installation which is capable of functioning as an information collection client. In addition to that, it is capable of processing the viewing information, which is based on the information collection client software.

The information viewer's client 2 is connected on the internet to the World Wide Web. The information viewer's client 2 functions as a computer in which World Wide Web browser software has been installed. Indications as to the URL which corresponds to which information provider's WWW site allow the information viewer's client 2 to view the information provider's WWW site.

The information collector's server 3 not only collects into a data base viewing information regarding the URL and how long the information provider's WWW site was viewed by the information viewer, and the new on-Internet detailed information, which is based on the statistical process according to access time, access frequencies, and genders, age groups and geographic regions of viewers but it also functions as a computer with an agent program by which this information is processed into the pre-provided format in which the information is to be supplied to the information provider. As such, the information collector's server 3 is connected on the Internet to the information provider's server 1 and the information viewer client 2.

In the network system constructed as explained above, the network system comprises an on-Internet information collection system made up of the information collector's server 3, which is connected to the Internet, the information collector client's, which is licensed from the information collector to the information provider; this information collector's software is the information client program which is stored in the storage medium 4.

Next, operation of this embodiment is discussed by explaining the processing order of the on-Internet information collection method on the basis of FIG. 2. It relates to the workings of this embodiment of the present invention.

In this case, it is assumed that a license has been received from the information collector, for example, stored in the CD-ROM of the storage medium 4, and that the information collection client program has been written/stored in advance onto the information provider's server 1. This information collection client program is the information collector's original program. This information collection client program has the processing procedures for automatically acquiring on-Internet information stored in it.

(1). In Step 201, the information viewer installs the information collection client program. This information collection client program is that which has been written/stored from the information collector's server 1 into the information viewer's own computer. In this case, the information collection client program is automatically transmitted on the Internet from the information provider's server 1.

Moreover, this information collection client is such that not only can it be written/stored onto the information provider's server 1 but it can have the information client program written/stored onto the information collector's server 3, in which case it is also possible to have the information collection client program transmitted from the information collector's server 3.

(2). In Step 202, the information viewer activates the information collection client program. In this case, it is possible for the information collection client program to be activated consciously or for the information collection client program to be automatically received when that page is viewed, in which case it would be possible for the activation to be automatic whenever the so-called POS (Point of Start) page is viewed.

(3). In Step 203, the information viewer accesses a desired information provider's WWW site address on the Internet. This WWW site address is commonly called the URL. It is also sometimes referred to as the web site address or the HTTP (Hyper Text Transfer Protocol). It is that by which, by using the browser software, the information viewer gains access to the web site which the information viewer wants to view.

(4). In Step 204, the information collection client program which has been installed onto the computer of the information viewer's client 2 collects the information as to which WWW site address was viewed and for how long. That is to say, the information as to addresses which have been accessed by the information viewer and the how long the viewer viewed those addresses is collected by the information collection client program by the use of the browser software.

(5). In Step 205, the information collection client program transmits the viewing information as to which WWW site address was viewed and for how long to the data base of the information collector's server 3. This information is collected when the information viewer views the WWW site.

(6). In Step 206, the data base program of the information collector's server 3 receives the transmission of the viewing information as to which WWW site address was viewed and for how long, which has been transmitted by the information collection client program, and stores this information in the data base. Here, the viewing information is moved from the computer of the information viewer's client 2 to the data base of the information collector's server 3, and stored there in the data base of the information collector's server 3.

In this data base, for example, as has been depicted as an example in FIG. 3, the corresponding name of the user, the access time and the URL (address) are stored. As an example, it is known that an information viewer, Jason, accessed http://www.fujitsu.com at 1950 hours 10 seconds on Jun. 25, 1996.

After the processing of this Step 206 is completed, the processing from Step 203 for all of the WWW site addresses of information providers which have been accessed by the information viewer are repeated for each address, and all of the viewing information which relates to the addresses accessed by the information viewer is collected. Then the processing by which this viewing information is stored in the date base of the information collector's server 3 is conducted, and at a specific interval (monthly, weekly, etc.), the following steps are implemented after all of the viewing information has been stored in the data base.

(7). In Step 207, the information collector's server 3 statistically processes the contents of the viewing information as to the address and the length of viewing time which has been stored in the data base. That is to say, calculations of such as the grand total of the total access time and total access frequencies by the genders of the viewer, the age groups of the viewer and the geographic regions of the viewer are calculated.

Figure 4A:
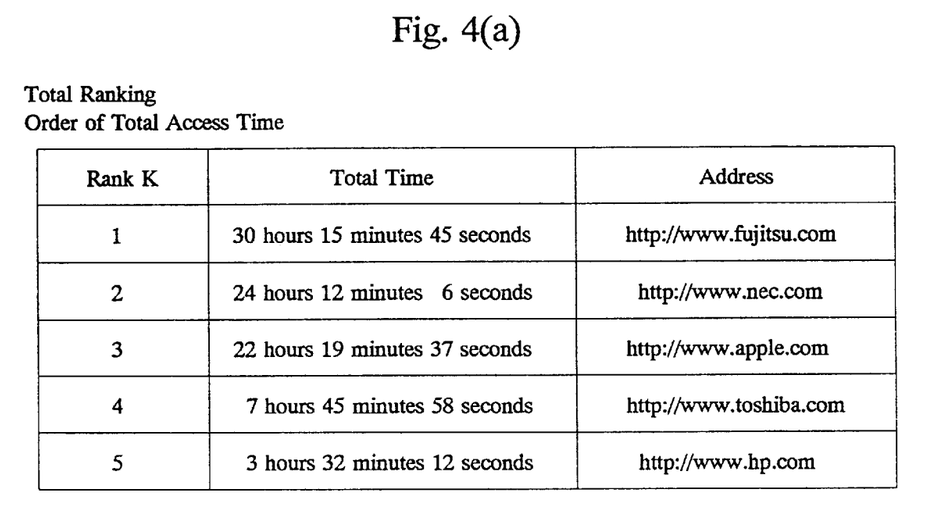
FIG. 4(a) is an explanatory diagram showing the results of the statistical processing (access time) to be attached to a report in the embodiment of FIG. 1.
Figure 4B:
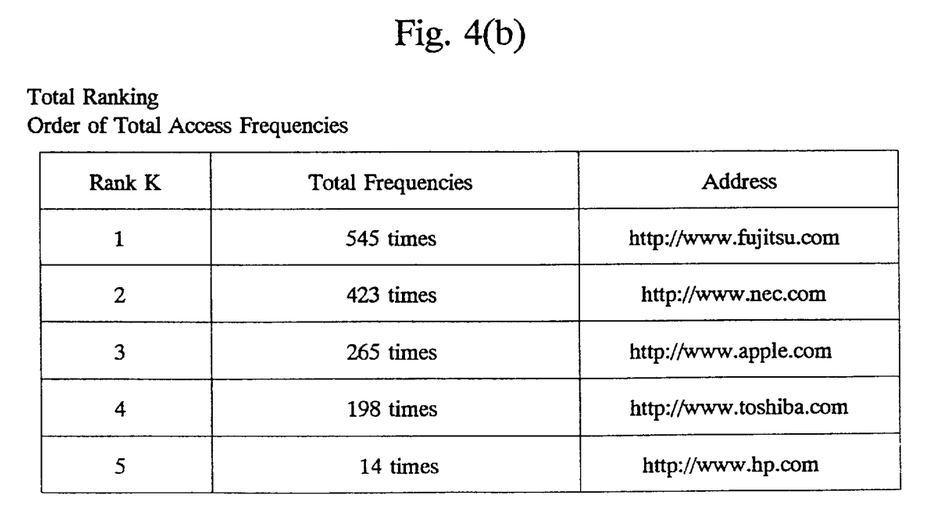
FIG. 4(b) is an explanatory diagram showing the results of the statistical processing (access frequencies) to be attached to a report in the embodiment of FIG. 1.
Figure 5:
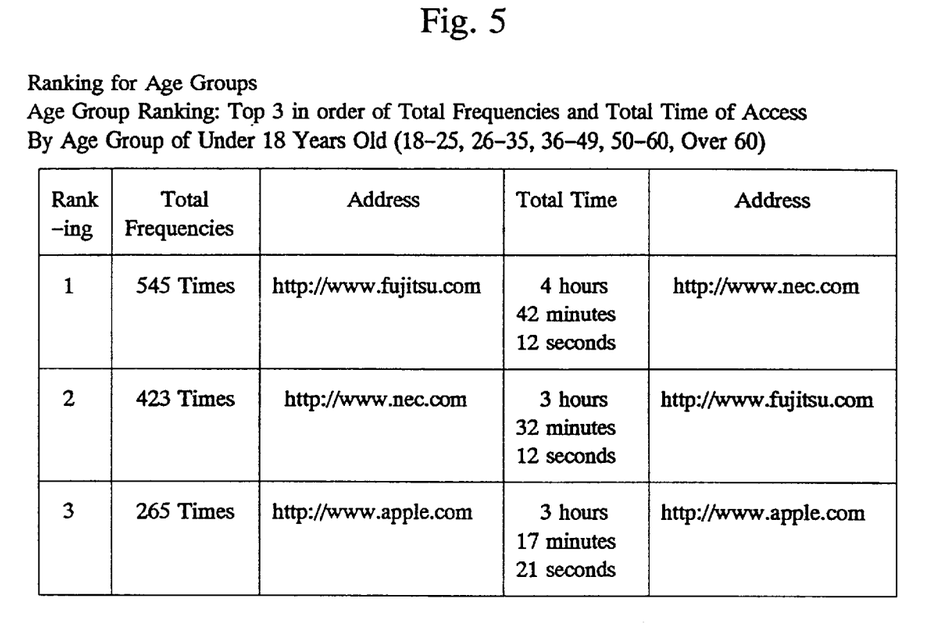
FIG. 5 is an explanatory diagram showing the results of the statistical processing (age groups) to be attached to a report in the embodiment of FIG. 1.
Figure 6:
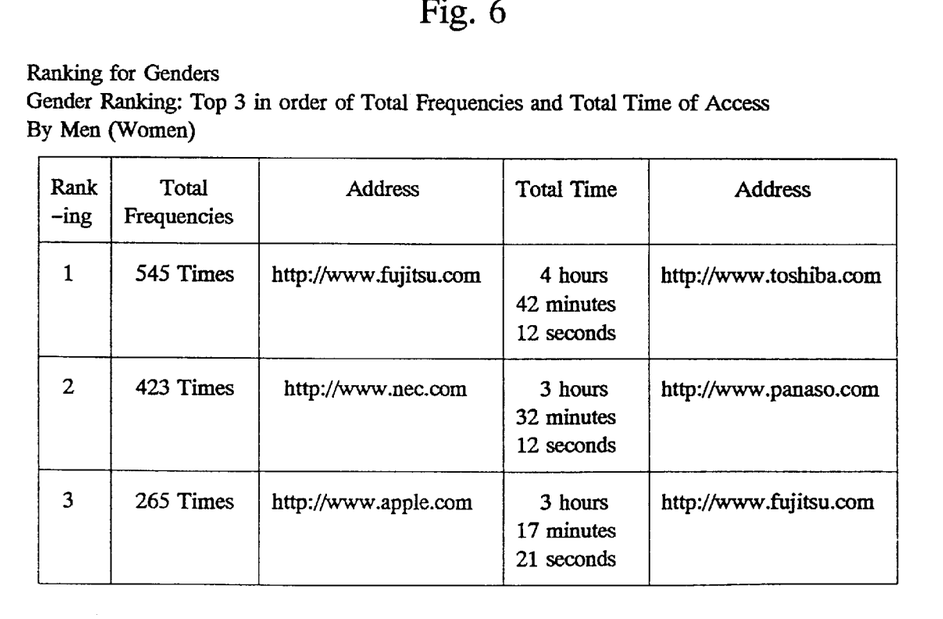
FIG. 6 is an explanatory diagram showing the results of the statistical processing (genders) to be attached to a report in the embodiment of FIG. 1.

This statistical processing, for example, as shown in an example of FIGS. 4(*a*) and (*b*), calculates by dividing into viewing time and viewing frequencies for the times viewed and the frequencies viewed, the ranking of the URL and the corresponding total viewing time and total viewing frequencies, with each one by the genders of the viewer, the age groups of the viewer and the geographic regions of the viewer.

As an example, it can be learned that the URL which was viewed for the longest time (30 hours 15 minutes and 45 seconds) was http://www.fujitsu.com, and the URL which was viewed most often (545 times) was http://www.fujitsu com.

(8). In Step 208, the information collection agent program of the information collector's server 3 repeatedly collects detailed on-Internet information. This information is based on the results of the statistical processing. This information collection agent program automatically acquires detailed information such as information which relates to pages which are popular and pages which are not popular, and stores such information in the data base. This detailed information comprises, for example, the number of pages, the number of links, the number of words, the number of characters, the types of fonts, the sizes of the fonts, the number of charts, the number of graphics, the ratio of the area of the graphics, the number of image maps, the ratio of the area of the image maps, the number of AVI files, the number of WAVE files, the types of backgrounds, the colors of the backgrounds and the types of plug-ins. What is meant by image maps is the graphics which have been linked. AVI files and WAVE files indicate video files and music files, respectively. Plug-ins are special function extensions.

(9). In Step 209, the information processing agent program of the information collector's server 3 statistically processes the collected information. That is to say, it statistically processes the collected information, and outputs this information upon putting it into the designated format or into the format which has been designated in accordance with the request from the information provider.

(10). In Step 210, the information which has been statistically processed is provided to the information provider in the form of a report. At this point in time, based on the information which has been collected, determination is made as to whether the web site on the information provider's WWW site is effective or ineffective, or whether there is room for improvement, or who are the on-Internet competitors, and summarized in report form.

This report, for example, can be summarized as a surfer pursuit report or such, and it is possible to create using items such as the below.

1. Outline
    1. Objective
    2. Current Month's Trends
    3. Reported Items
2. Statistics
    1. Access Time
    2. Number of Accesses
    3. Top 3 Ages
    4. Top 3 by Genders
3. Introduction of Competitive Sites
    1. Defining the Competition
    2. Comparative Analysis of Menu Pages and Overall
4. This Month's Results and Suggestions
    1. Improvements Over the Previous Month
    2. This Month's Problematic Points
    3. Proposals Toward an Even Better Site For example, an example of the statistical materials would be to put the overall ranking of the total access time and the overall ranking of the total access frequencies (FIGS. 4(*a*) and (*b*)) of the top 3 (FIG. 5) according to the age groups of under 18 years old, 18 to 25 years old, 26 to 35 years old, 36 to 49 years old, 50 to 60 years old and over 60 years old, and the top 3 in total access frequencies and access time (FIG. 6) according to the genders of the viewer. For others, it is possible to do things such as reporting the total access frequencies and time according to geographic regions ranking.

Figure 7:
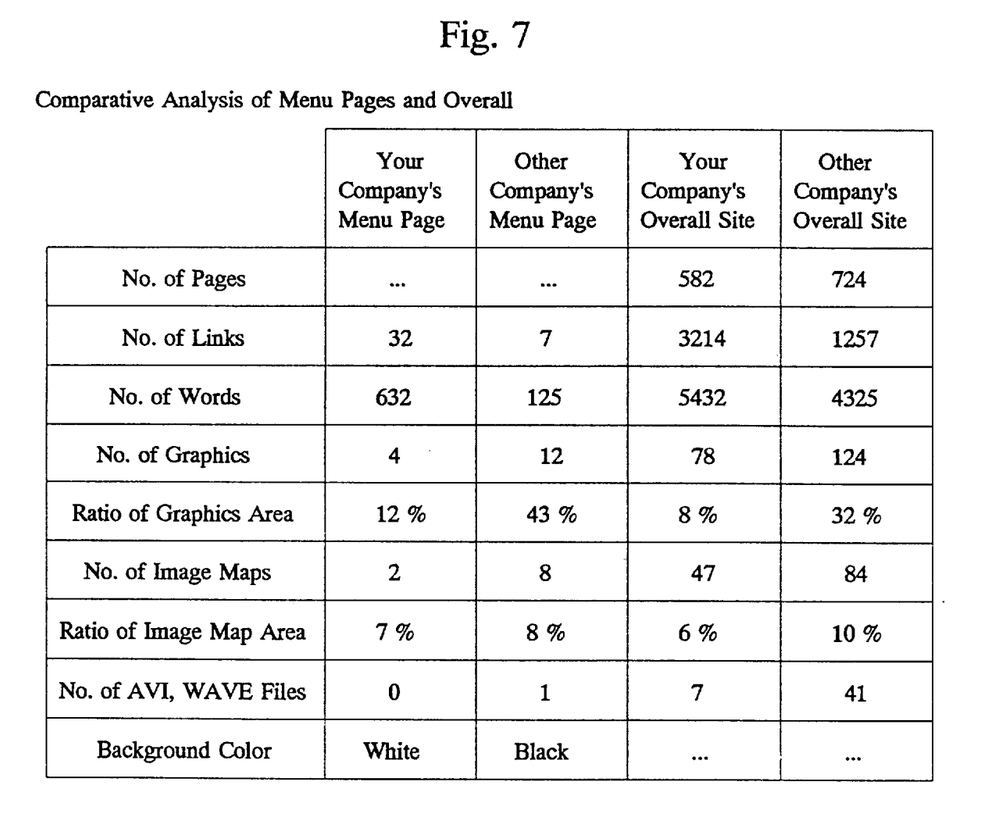
FIG. 7 is an explanatory diagram showing the results of the statistical processing (menu page and comparative analysis of the overall) to be attached to a report in the embodiment of FIG. 1.

Furthermore, as an example of materials on comparative analysis of the menu page and the overall which compare his site vis-a-vis the sites of the competition. For example, as indicated in FIG. 7, there are reports such as on comparative analysis relative to your own company's overall site versus the overall site of another company in relation to detailed information such as the number of pages, the number of links, the number of words, the number of graphics, the ratio of the area of the graphics, the number of image maps, the ratio of the area of the image maps, the number of AVI and WAVE files and the colors of the background.

And, based on the contents of such as the above items 1–3, improvements over the previous month, this month's problematic points, and proposals toward an even better site, as the sub-items 1–3 of the item 4, can be proposed by the information collector to the information provider.

As can be seen from the above, based on the processing procedures of the information collection client program, the viewing information as to the URL and the viewing time of the WWW site viewed by the information viewer is collected into the data base of the information collector. This viewing information may be statistically processed according to access time, access frequencies, and genders, age groups and geographic regions of viewers. Based on the results of this statistical processing, the detailed on-Internet information can be automatically collected onto the data base of the information collector.

Thus, the automatic collection of the information by means of this information collection client program makes it possible to obtain more detailed information which is less biased. Further, one can obtain detailed information such as the extent to which those who are accessing your company's page are accessing the pages of other companies, which can be used to evaluate your company's web site.

From the above, in more concrete terms, an information provider who has set up a web site can know more detailed information such as who viewed which page for how long, what are competitor companies for him on the Internet, whether his web site is advantageous or disadvantageous in comparison with web sites of the competitors, where the problems of his web site are and what are the strengths of his web site, what should be done to make his web site more effective, and such.

Thus, according to the on-Internet network system of this embodiment, in addition to the server 1 of the information provider and the client 2 of the information viewer, the server 3 of the information collector is connected on the Internet. By merely writing/storing the information collection client program, the original of which is stored in storage medium 4, onto the server 1 of the information provider or the server 3 of the information collector, when the information collection client program has been installed and activated, the viewing information is collected and stored when the information viewer views the information provider's WWW site. Based on the results of the statistical process of this viewing information, it is possible to automatically acquire detailed on-Internet information.

And by submitting such statistically-processed detailed information as a report in a given form to the information provider, the information provider can use this report to increase the information viewers' access time and/or access frequencies, and to better structure and improve the contents of what is viewed on the World Wide Web in order to improve the information viewed on the World Wide Web.

(Embodiment 2)

Figure 8:
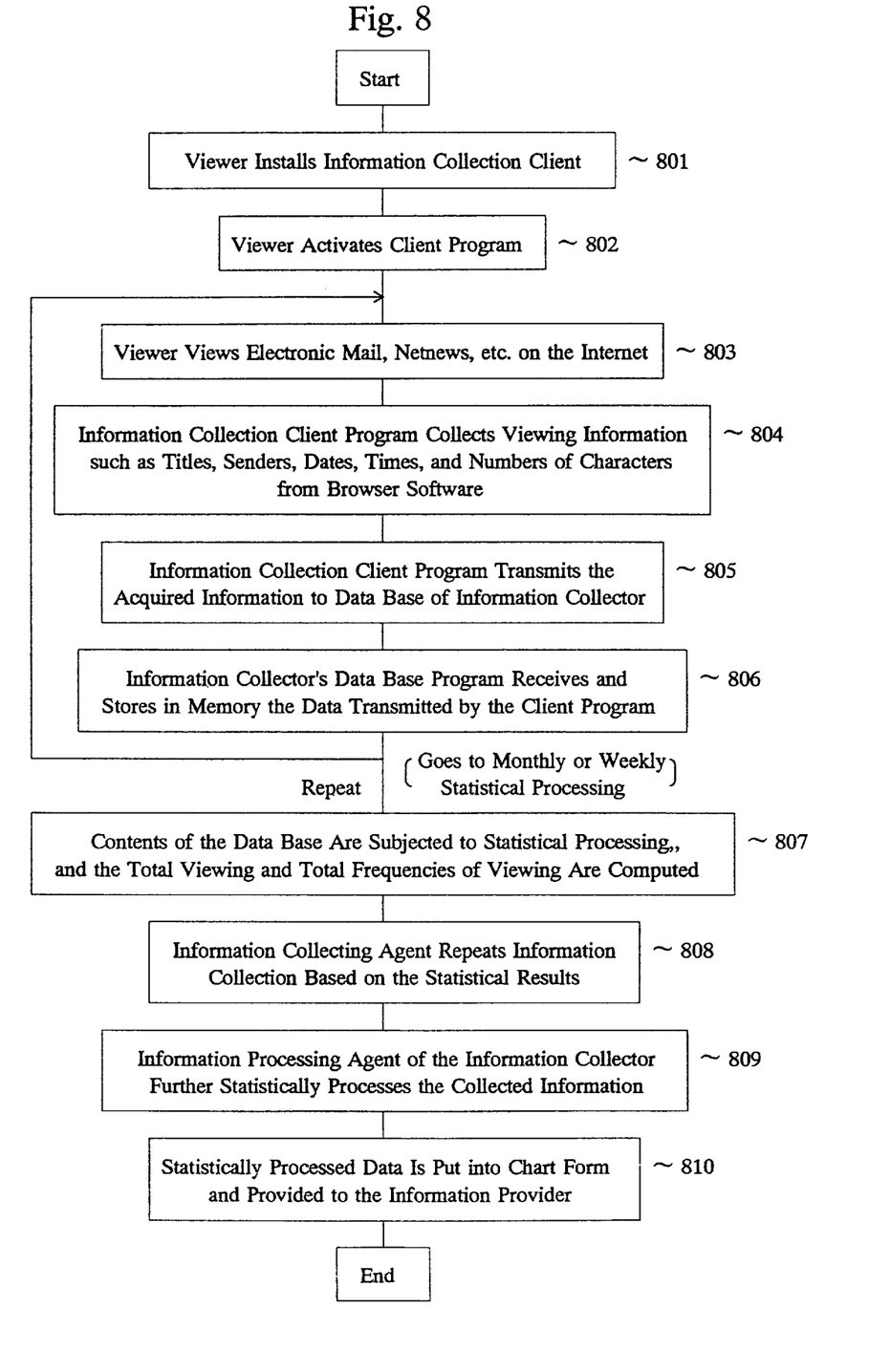
FIG. 8 is a flow chart showing an example of the order of the processing by the information collection client program in the on-Internet network system as another embodiment of the present invention.
Figure 9:
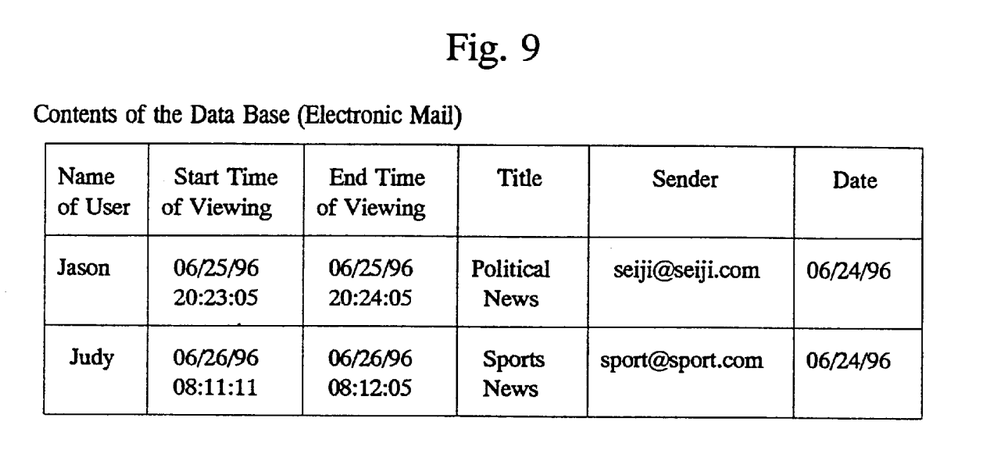
FIG. 9 is an explanatory diagram showing an example of the contents of the data base in the embodiment of FIG. 8.
Figure 10A:
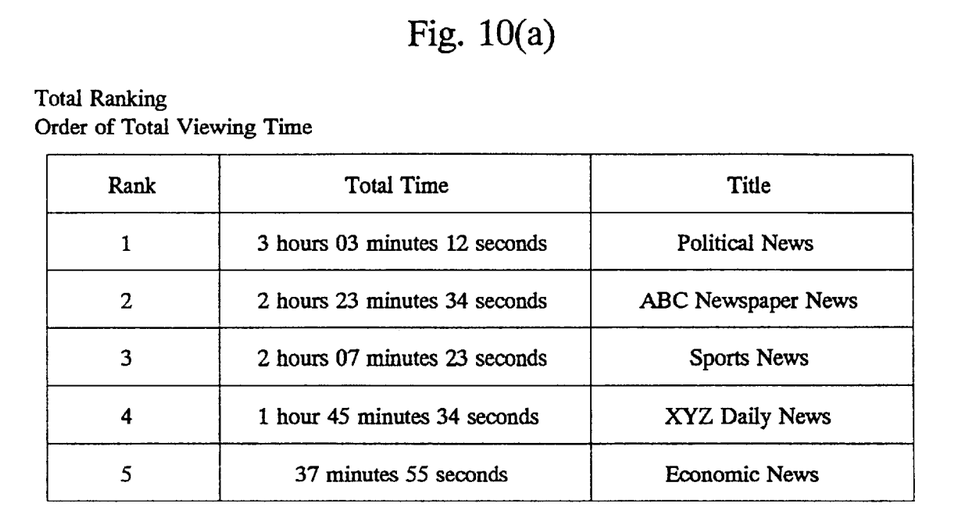
FIG. 10(a) is an explanatory diagram showing the results of the statistical processing (viewing time) to be attached to a report in the embodiment of FIG. 8.
Figure 10B:
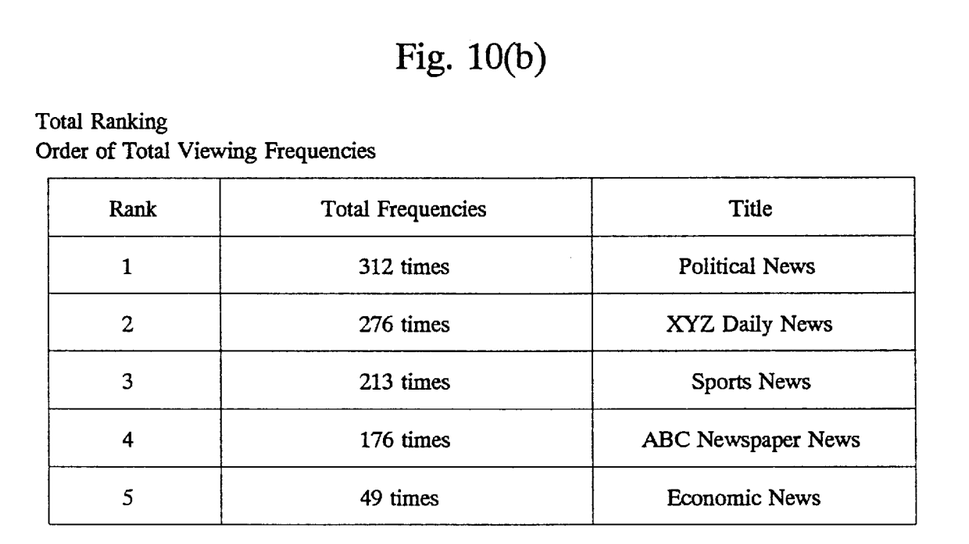
FIG. 10(b) is an explanatory diagram showing the results of the statistical processing (viewing frequencies) to be attached to a report in the embodiment of FIG. 8.
Figure 11:
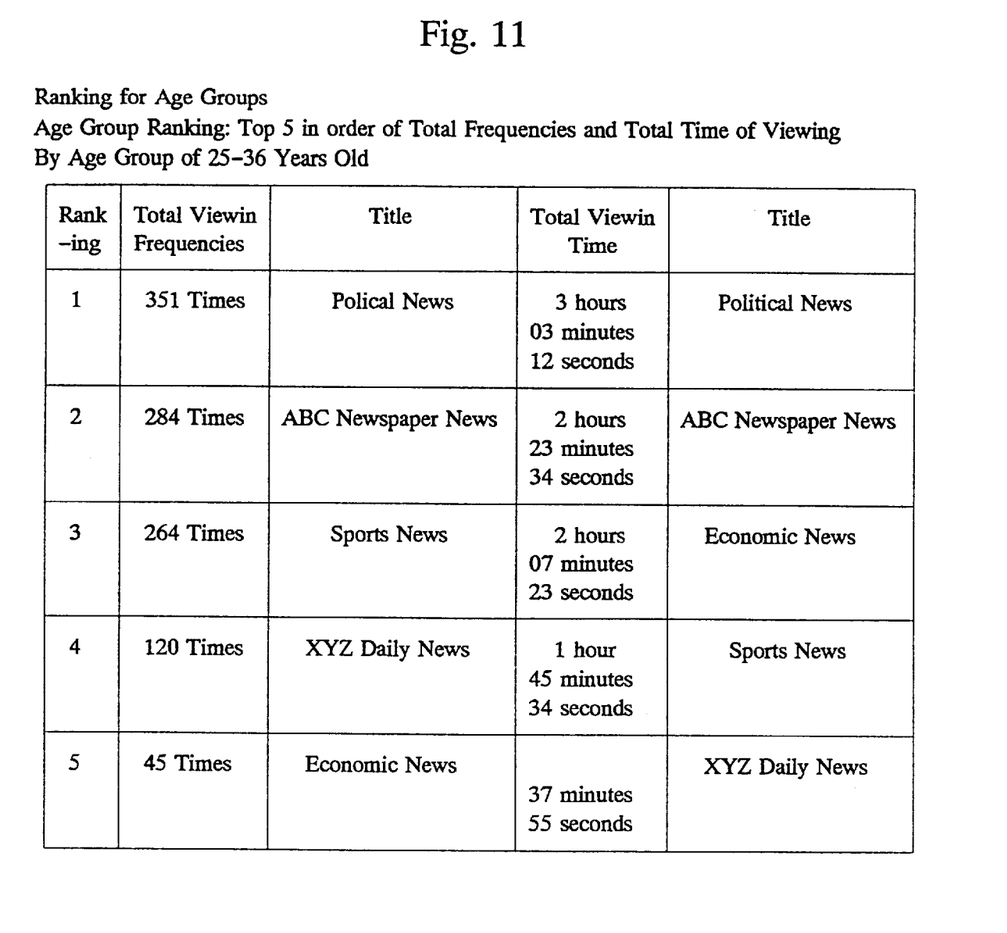
FIG. 11 is an explanatory diagram showing the results of the statistical processing (age groups) to be attached to a report in the embodiment of FIG. 8.
Figure 12:
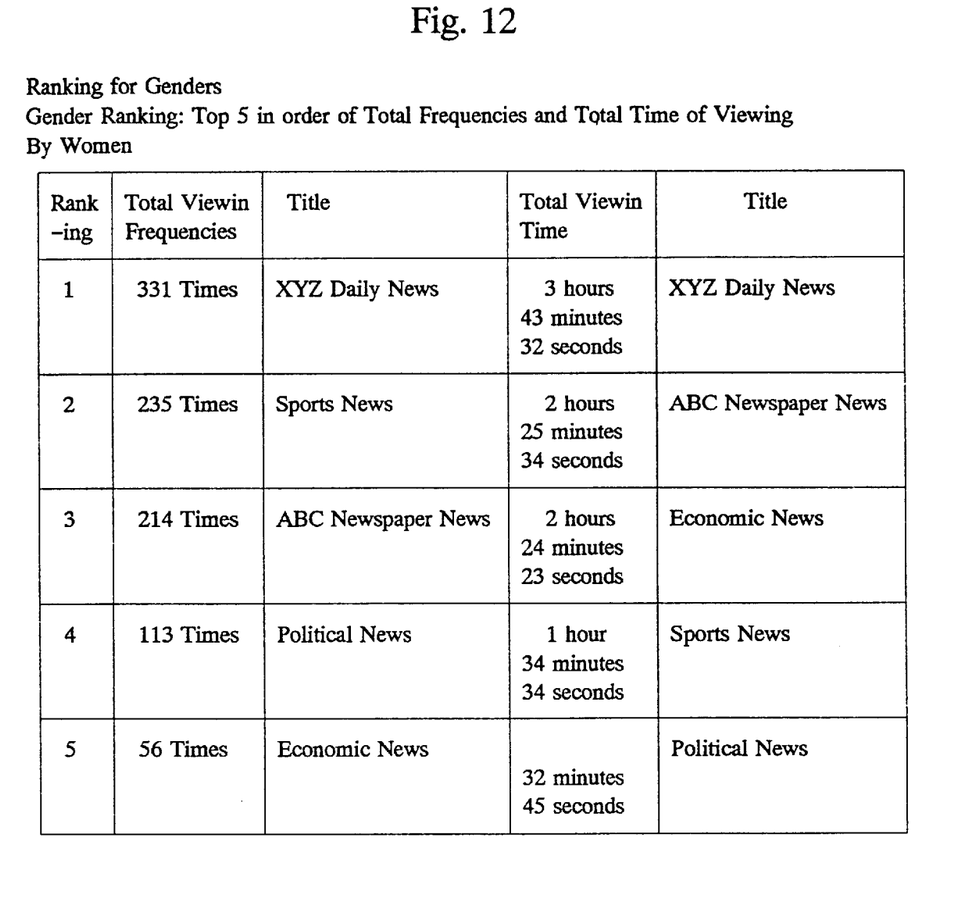
FIG. 12 is an explanatory diagram showing the results of the statistical processing (genders) to be attached to a report in the embodiment of FIG. 8.

FIG. 8 is a flow chart showing an example of the order of the processing by the information collection client program in the on-Internet network system as another embodiment of the present invention; FIG. 9 is an explanatory diagram showing an example of the contents of the data base in this embodiment; and FIGS. 10–12 are explanatory diagrams showing the results of the statistical processing to be attached to a report in this embodiment.

Similarly to Embodiment 1, the network system on the Internet of this embodiment comprises servers 1 of a plurality of information providers, clients 2 of a plurality of information viewers and a server 3 of an information collector. They are connected with each other on the Internet. Here, however, differing from Embodiment 1, information supplied by information providers is, instead of pull-type information at a WWW site, push-type information such as electronic mail and mailing lists, and information such as netnews.

Namely, in the present embodiment, when an information collection client program has been installed and is activated when an information viewer views electronic mail, mailing lists, netnews of an information provider, titles, senders, dates, and time periods of the information viewed by the information viewer is acquired onto the information collector's server. The acquired viewing information is statistically processed according to viewing time, viewing frequencies, and genders, age groups and geographic regions of viewers. Then the detailed on-Internet information, which is based on the results of this statistical processing, is automatically acquired by the information collector's server.

Next, operation of this embodiment is discussed by explaining the processing order of the on-Internet information collection method on the basis of FIG. 8. In the following, detailed description will be omitted for steps similar to ones in the processing order of Embodiment 1 (FIG. 2).

(1). In Step 801, similarly to Embodiment 1, the information viewer installs the information collection client program. This information collection client program is that which has been written/stored from the information collector's server 1 into the information viewer's own computer.

(2). In Step 802, similarly to Embodiment 1, the information viewer activates the information collection client program.

(3). In Step 803, the information viewer views electronic mail, mailing lists, netnews, or the like of a desired information provider.

(4). In Step 804, the information collection client program which has been installed onto the computer of the information viewer's client 2 collects the viewing information as to titles, senders, dates, time periods, the numbers of characters, etc. from a browser software. Namely, by using a browser software such as an electronic mail software, the information viewed by the information viewer is collected by the information collection client program.

(5). In Step 805, the information collection client program transmits the viewing information as to the titles, senders, dates, time periods, the numbers of characters, etc., to the data base of the information collector's server 3. This information has been collected by the information collection client program when the information viewer views the information.

(6). In Step 806, the data base program of the information collector's server 3 receives the transmission of the viewing information as to the titles, senders, dates, time periods, the numbers of characters, etc., which has been transmitted by the information collection client program, and stores this information in the data base. Here, the viewing information is moved from the computer of the information viewer's client 2 to the data base of the information collector's server 3, and stored there in the data base of the information collector's server 3.

In this data base, for example, as has been depicted as an example in FIG. 9, the corresponding name of the user, start time of viewing, end time of viewing, title, sender, and date are stored. As an example, it is known that an information viewer, Jason, viewed, from 20:23:05 to 20:24:05 on Jul. 25, 1996, the political news supplied on Jun. 24, 1996 from seiji@seiji.com.

After the processing of this Step 806 is completed, the processing from Step 803 for electronic mail, mailing lists, netnews, etc., of all the information providers which have been designated by the information viewer are repeated, and all of the viewing information according to the designation by the information viewer is collected. Then, the processing by which this viewing information is stored in the data base of the information collector's server 3 is conducted. Monthly or weekly, the following steps are implemented after all of the viewing information has been stored in the data base.

(7). In Step 807, the information collector's server 3 statistically processes the contents of the viewing information as to the titles, senders, dates, time periods, the numbers of characters, etc., which has been stored in the data base. That is to say, total time length and total frequencies of viewing are calculated by the genders of the viewer, by the age groups of the viewer, and by the geographic regions of the viewer.

In this statistical processing, for example, as shown in an example of FIGS. 10(*a*) and (*b*), the titles are ranked in order of total time length or total frequencies for viewing them. Respective rankings are calculated for genders of the viewer, age groups of the viewer, geographic regions of the viewer, and for the total data.

As an example, it can be seen that the title of news which was viewed for the longest time is the political news, with its total viewing time being 3 hours 3 minutes and 12 seconds, and that the title of news which was viewed most often is also the political news, with its total viewing frequencies being 312 times.

(8). As in the above Embodiment 1, in Step 808, an information collection agent program of the information collector's server 3 collects detailed on-Internet information, again, on the basis of the results of the statistical processing. This information collection agent program automatically acquires detailed information relating to news of the popular titles and news of non-popular titles, and stores such information in a data base.

(9). As in the above Embodiment 1, in Step 809, the information processing agent program of the information collector's server 3 statistically processes the collected information. That is to say, it statistically processes the collected information and outputs the processed information in given tables or in formats corresponding to the request of the information provider.

(10). In Step 810, the information which has been statistically processed is provided to the information provider in the form of a report. At this point in time, based on the collected information, it is determined whether the service of electronic mail, mailing list, netnews, etc. supplied by the information provider is effective or ineffective, or whether there is room for improvement, or who are the on-Internet competitors, and summarized in the report form.

For example, the statistical materials may be provided in the table forms showing rankings in order of total viewing time and in order of total viewing frequencies for all the data (FIGS. 10(*a*) and (*b*)), the top 5 in order of total viewing frequencies and time for such an age group of 25 to 36 years old, for example (FIG. 11), and the top 5 in order of total viewing frequencies and time for the genders of the viewer (FIG. 12). Otherwise, for geographic regions, ranking in order of total access frequencies and time may be reported as material.

As can be seen from the above, based on the processing procedures of the information collection client program, the viewing information as to the titles, senders, dates, time lengths, the numbers of characters, etc. of the electronic mail, mailing lists, netnews, etc. viewed by the information viewer is collected into the data base of the information collector. This viewing information may be statistically processed according to viewing time, viewing frequencies, and genders, age groups and geographic regions of viewers. Based on the results of this statistical processing, the detailed on-Internet information can be automatically collected onto the data base of the information collector.

Thus, the automatic collection of the information by means of this information collection client program makes it possible to obtain more detailed information which is less biased. Further, when one evaluates his company's services of electronic mail, mailing list, netnews, etc. he can obtain detailed information, for example, on frequencies and providers of other companies' information viewed by persons viewing his company's push-type information.

From the above, in more concrete terms, an information provider who supplies information on the Internet can know more detailed information as who viewed which site for how long, what are competitor companies for him on the Internet, whether his information is advantageous or disadvantageous in comparison with information of the competitors, where the problems are and what are the strengths of his information service, what should be done to make his service more effective, and such.

Thus, according to the on-Internet network system of this embodiment, in addition to the server 1 of the information provider and the client 2 of the information viewer, the server 3 of the information collector is connected on the Internet. By merely writing/storing the information collection client program, the original of which is stored in storage medium 4, onto the server 1 of the information provider or the server 3 of the information collector, when the information collection client program has been installed and activated, the viewing information is collected and stored when the information viewer views the electronic mail, mailing lists, netnews etc. of the information provider. Based on the results of the statistical process of this viewing information, it is possible to automatically acquire detailed on-Internet information.

And by submitting such statistically-processed detailed information as a report in a given form to the information provider, the information provider can use this report to improve his information such as the electronic mail, mailing lists, netnews, etc. to have better structure and better contents, increasing information viewers' viewing time and/or viewing frequencies.

The invention made by the present inventor has been described in detail by means of Embodiment 1 and Embodiment 2 of the invention. The present invention, however, should not necessarily be limited to the form of the above-described embodiment, and can be altered variously within the scope of the invention.

For example, the detailed information which has been collected based on the results of the statistical processing is not limited only to the information which has been indicated above. Rather, with this invention, it is possible to collect other information of a wide range of applications, such as the size of the page, the size of the graphics, the position of the graphics, how large the graphics are, the number of graphs, the number of links (within sites of the same company), the number of links (of those other than those of the same company). The detailed information which the information provider requires determines what information is collected.

Furthermore, information supplied by the information provider is not limited to a WWW site, electronic mail, mailing lists, netnews etc. The present invention can be widely applied for general files of information search methods and services which can be used on the Internet, such as Gopher, file transfer, remote log-in, and so on.

Further, the present invention can be applied for an intranet connected to the Internet. For example, the similar technology can be applied for information sent from and received by the inside of an intranet.

Among the inventions disclosed herein, the representative ones have effects described briefly in the following.

(1). When the information viewer installs and activates the information collection client program, the viewing information which relates to what has been viewed by the information viewer is collected onto the server of the information collector. By statistically processing this collected viewing information, it is possible to collect on the Internet viewing information which is less biased and in greater detail because it is possible to automatically acquire onto the server of the information collector the on-Internet detailed information which is based on the results of this statistical processing.

(2). Based on the information which has been collected in accordance with the above described (1), in terms of evaluating his own web site, it is possible to become aware of things such as to what extent the people who are accessing his page are accessing the pages of which other companies.

(3). Based on the information which has been collected in accordance with the above described (1), it can be more specifically stated that it is possible for information providers who have set up a web site to know more detailed information such as who is viewing which pages for how long, what are the companies which are the competition on the Internet for the information provider, whether their own page is better or worse as compared to the pages of the competition, what sort of problems their own web site has and what are the strengths of their own web site, and what should be done to make the web site more effective.

(4). Given the characteristics of the above described information when it is collected as described above in (1), the information viewers are the people who view the web site of the information provider. At the same time, they are the ones to whom viewing information has been offered as enticement of some sort of promotion. That is to say, the information viewers can be considered to constitute a group of people who strongly reflect the market trends.

(5). Given the characteristics of the above described information when it is collected as described above in (1), it is possible to gain an understanding about the trends of the information viewers. These information viewers are prospective customers, and as such, they are in a position to fulfill an important role in the development of new products and services, determining how investments should be made, and direct marketing techniques (such as mail order and direct mail).

(6). Given the characteristics of the above described information when it is collected on the Internet as described above in (1), it is possible to define information about competitive information providers. Furthermore, it is possible, by analyzing the differences between your own web site vis-a-vis the competitions' web sites, to obtain marketing ideas about how to construct a web site. These ideas could be used to make your own web site into one which would be more attractive to the information viewers.

(7). When evaluating services of electronic mail, mailing lists, netnews of an information provider company on the basis of the information collected as described above in (1), evaluation and understanding are possible similarly as in (2)–(6) above, and the information provider who provides the services of the electronic mail, mailing lists, netnews, etc. can know more detailed information on his competitors, his advantage/disadvantage and his weakness/strength in comparison with the competitors, and the way to improve in efficiency, etc.

What is claimed is:

1. An on-Internet information collection method for collecting information, on the Internet whereon servers of a plurality of information providers, clients of a plurality of information viewers and a server of an information collector are connected with each other, onto the server of the information collector on the basis of the condition of activities of the plurality of information viewers viewing information of the plurality of information providers, characterized in that said method comprises steps of:

acquiring, when an information collection client program has been installed and activated for any one of said information viewers to view information of any one of said information providers, viewing information of viewing action of the information viewer onto the server of said information collector;

processing statistically said acquired viewing information; and acquiring automatically, on the basis of the results of said statistical processing, detailed on-Internet information onto said server of said information collector.

2. The on-Internet information collection method according to claim 1, wherein:

said information of said information provider is information at WWW (World Wide Web) of said information provider;

URL (Uniform Resource Locator) of said WWW, and time is acquired as the viewing information of said information viewer onto the server of said information collector; and said acquired viewing information is processed statistically in terms of access time, access frequencies, and the viewer's genders, age groups and regions.

3. The on-Internet information collection method according to claim 1, wherein:

said information of said information provider is electronic mail, mailing lists, and netnews;

titles, senders, dates, times of said electronic mail, mailing lists, and netnews are acquired as the viewing information of said information viewer onto the server of said information collector; and said acquired viewing information is processed statistically in terms of viewing time, viewing frequencies, and the viewer's genders, age groups and regions.

4. The on-Internet information collection method according to claim 1, wherein said detailed information comprises the number of pages, the number of links, the number of words, the number of letters, font types, font sizes, the number of charts, the number of graphics, the ratio of graphic areas, the number of image maps, the ratio of image map areas, the number of AVI (Audio Video Interleave) files, the number of WAVE files, types of the background, colors of the background, and types of plug-ins.

5. The on-Internet information collection method according to claim 1, wherein said results of said statistical processing and said detailed on-Internet information on the basis of the results of the statistical processing are provided to corresponding information providers.

6. A storage medium for storing an information collection client program for collecting information, on the Internet whereon servers of a plurality of information providers, clients of a plurality of information viewers and a server of an information collector are connected with each other, onto the server of the information collector on the basis of the condition of viewing activities of the plurality of information viewers on WWW (World Wide Web) of the plurality of information providers, characterized in that said storage medium stores the process comprising steps of:

acquiring information viewed by said information viewers as to URL (Uniform Resource Locator) of said WWW of said information providers and the time onto said server of said information collector;

processing statistically said acquired information in terms of access time, access frequencies, and the viewer's genders, age groups and regions; and acquiring, on the basis of the results of said statistical processing, detailed on-Internet information onto said server of said information collector, wherein said information collection client program of said storage medium is written onto said servers of said information providers or onto said server of said information collector so that, when the information collection client program has been installed and activated for any one of said information viewers to view said information at WWW of any one of the information providers, said steps from acquiring the viewing information to acquiring the detailed information are automatically processed.

7. A storage medium for storing an information collection client program for collecting information, on the Internet whereon servers of a plurality of information providers, clients of a plurality of information viewers and a server of an information collector are connected with each other, onto the server of the information collector on the basis of the condition of activities of the plurality of information viewers viewing electronic mail, mailing lists, and netnews of the plurality of information providers, characterized in that said storage medium stores the process comprising steps of:

acquiring viewing information as to titles, senders, dates and times of the activities of said information viewers viewing the electronic mail, mailing lists, and netnews of said information providers onto said server of said information collector;

processing statistically said acquired viewing information in terms of viewing time, viewing frequencies, and the viewer's genders, age groups and regions; and acquiring, on the basis of the results of said statistical processing, detailed on-Internet information onto said server of said information collector, wherein said information collection client program of said storage medium is written onto said servers of said information providers or onto said server of said information collector so that, when the information collection client program has been installed and activated for any one of said information viewers to view said information at WWW of any one of the information providers, said steps from acquiring the viewing information to acquiring the detailed information are automatically processed.

8. An on-Internet information collection system for collecting information, on the Internet whereon servers of a plurality of information providers and clients of a plurality of information viewers are connected with each other, on the basis of the condition of viewing activities of the plurality of information viewers on WWW (World Wide Web) of the plurality of information providers, characterized in that a server of an information collector is connected to the Internet, said server comprises:

a means for acquiring information viewed by said information viewers as to URL (Uniform Resource Locator) of said WWW of said information providers and the time;

a means for storing said acquired information; and a means for acquiring detailed on-Internet information, on the basis of the results of statistical processing of said stored information in terms of access time, access frequencies, and the viewer's genders, age groups and regions, wherein, when an information collection client program has been installed and activated for any one of said information viewers to view said information at WWW of any one of said information providers, said means for acquiring information acquires the viewing information, said means for storing acquired information stores the acquired information, and, on the basis of the results of statistical processing of the stored information, said means for acquiring the detailed on-Internet information automatically acquires the detailed on-Internet information.

9. An on-Internet information collection system for collecting information, on the Internet whereon servers of a plurality of information providers and clients of a plurality of information viewers are connected with each other, on the basis of the condition of activities of the plurality of information viewers viewing electronic mail, mailing lists, and netnews of the plurality of information providers, characterized in that a server of an information collector is connected to the Internet, said server comprises:

a means for acquiring viewing information as to titles, senders, dates and times of the activities of said information viewers viewing the electronic mail, mailing lists, and netnews of said information providers;

a means for storing said acquired viewing information; and a means for acquiring detailed on-Internet information, on the basis of the results of statistical processing of said stored viewing information in terms of viewing time, viewing frequencies, and viewer's genders, age groups and regions, wherein, when an information collection client program has been installed and activated for any one of said information viewers to view electronic mail, mailing lists, and netnews of any one of said information providers, said means for acquiring viewing information acquires the viewing information, said means for storing acquired viewing information stores the acquired viewing information, and, on the basis of the results of statistical processing of the stored viewing information, said means for acquiring the detailed on-Internet information automatically acquires the detailed on-Internet information.

* * * * *